United States Patent [19]

Lymn

[11] Patent Number: 4,928,869
[45] Date of Patent: May 29, 1990

[54] SOLDER LEVELLER

[76] Inventor: Peter P. A. Lymn, Lime Kiln Cottage, Buriton, Petersfield, Hampshire, United Kingdom, GU31 5SJ

[21] Appl. No.: 282,313
[22] PCT Filed: May 27, 1987
[86] PCT No.: PCT/GB87/00367
 § 371 Date: Nov. 25, 1988
 § 102(e) Date: Nov. 25, 1988
[87] PCT Pub. No.: WO87/07196
 PCT Pub. Date: Dec. 3, 1987

[30] Foreign Application Priority Data

May 29, 1986 [GB] United Kingdom ............... 8613105

[51] Int. Cl.$^5$ ................... B23K 3/06; B23K 1/08
[52] U.S. Cl. .................................. 228/20; 228/47; 228/40; 228/43; 118/63; 118/404; 118/424
[58] Field of Search ............... 228/20, 40, 43, 47, 228/254, 179, 180.1; 118/63, 404, 424; 427/96, 349, 360

[56] References Cited

U.S. PATENT DOCUMENTS

| 4,099,194 | 7/1978 | Kümmerl | 354/321 |
| 4,563,974 | 1/1986 | Price | 118/63 |
| 4,608,941 | 9/1986 | Morris | 118/63 |
| 4,618,841 | 10/1986 | Schwerin | 427/96 |

FOREIGN PATENT DOCUMENTS 2063925 6/1981 United Kingdom .............. 228/43

Primary Examiner—Kenneth J. Ramsey
Assistant Examiner—Samuel M. Heinrich
Attorney, Agent, or Firm—Lee A. Strimbeck

[57] ABSTRACT

A solder leveller for tinning exposed metal on printed circuit boards comprises a solder bath and paired rollers therein for carrying a board in a curvilinear path downwardly into, through and upwardly out of the bath. At least one pair of rollers having a board engaging nip within the bath is driven. The bath includes means for providing a solder-oxidation inhibiting oil over the solder.

25 Claims, 4 Drawing Sheets

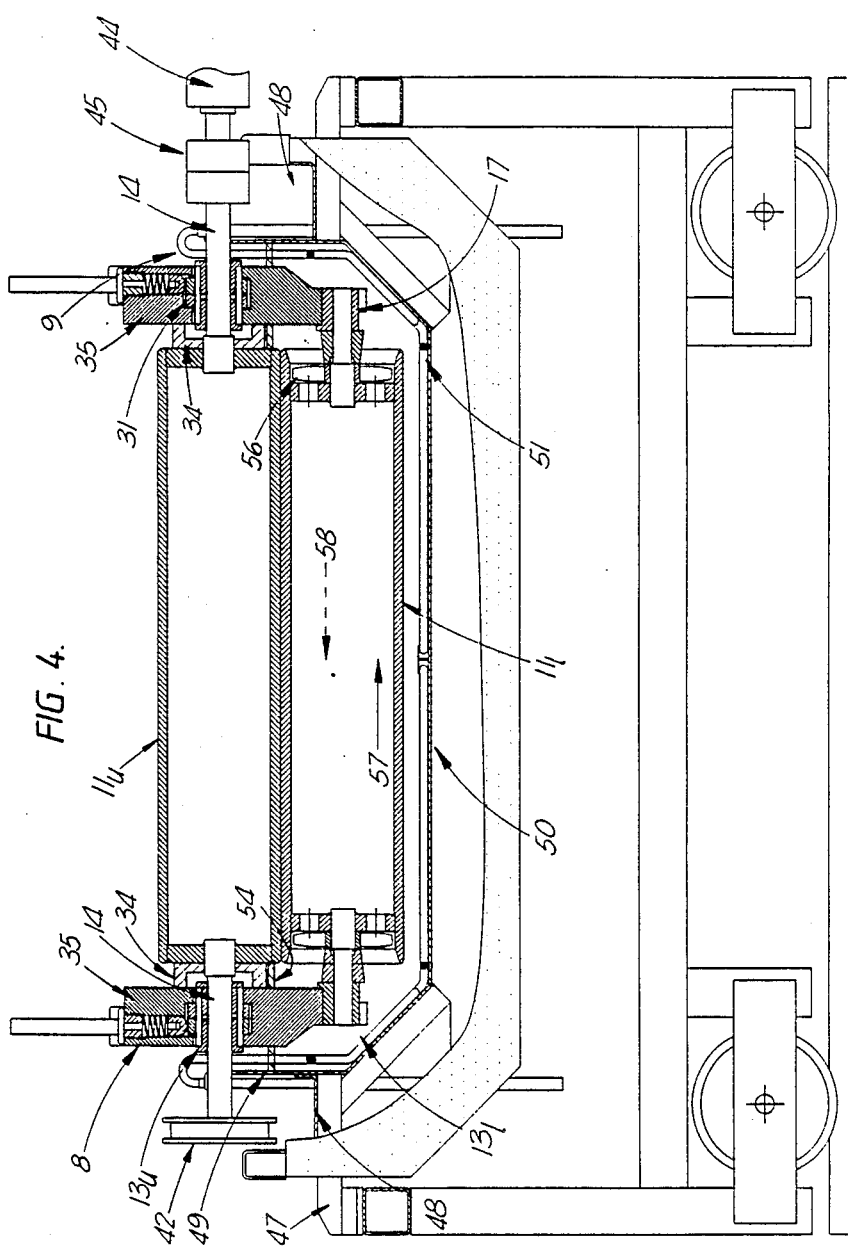

SOLDER LEVELLER

THE FIELD OF THE INVENTION

The present invention relates to a solder leveller.

THE BACKGROUND OF THE INVENTION

A solder leveller is apparatus for tinning exposed metal—normally copper—on printed circuit boards, and similar elements—particularly for supporting electronic components—hereinafter referred to simply as "boards", with solder preparatory to connection of components thereto. Generally a solder leveller comprises a bath of molten solder into which a board is lowered vertically for tinning with solder and means for leveling solder deposited on the board as it si withdrawn from the bath. Such a leveller is the subject of British Patent No. 2151528 and equivalent U.S. Pat. No. 4,599,966, both in the name of the present applicant.

Such conventional solder levellers operate on a one-at-a-time basis, inserting boards into a deep, narrow soilder bath one-at-a-time from above. This is an essentially slow process, although the speed of withdrawal from the solder is relatively high in terms of speed of travel of boards along conveyors through pre- and post-treatment stages, up-and down-stream of the leveller. A feature of a vertical acting solder leveller is that the lower part of the board remains in the solder for longer than the upper part. This can result in formation of a thicker copper/tin intermetallic compound layer on the lower part to which it can be difficult to satisfactorily solder components. Such a thicker layer can cause a board to "age" more rapidly, aggravating solder-ability problems.

Intermetallic compounds can be both of the $Cu_6Sn_5$ type and of the $Cu_3Sn$ type. The latter is particularly problematic and more prone to formation where the board experiences longer dwell times in hotter solder.

Equipment for continuous soldering treatment is known in various forms, in particular for soldering components to pre-tinned boards. "Drag soldering" involves the dragging of a board with its components across the surface of a bath of molten solder, see for instance U.S. Pat. Specification No. 4,284,225 (EMP Ag). "Wave Soldering" involves passing a board across the top of a wave created, in a bath of molten solder, see for instance British Patent Specification No. 2,117,690A. (Zevatron GmbH).

Both drag and wave soldering have been adapted for continuous tinning. U.S. Pat. Specification No. 4,277,518 (Gyrex Corp.) describes the use of a continuous conveyor forced down into molten solder by a fixed upper bed to drag a board through the solder. The board tends to float up against the conveyor which causes frictional engagement of the board with the conveyor. The speed of forward operation is limited by potential slippage between the board and the conveyor.

U.S. Pat. Specification No. 4,465,014 (Siemens Ag) describes movement of a board through a solder wave so that solder wells on to the top surface of the board. Speed of operation is limited by time available for heat transfer from the solder to the board.

The object of the present invention is to provide an improved solder leveller capable of operating fast enough for effective operation of the levelling means and yet able to heat the board quickly in a compact solder bath with a short dwell time in the bath to minimize the formation of an intermetallic compound layer.

Another object of the invention is to provide a solder leveller including means by which a board is rapidly heated to the temperature at which exposed copper on the board is wetted by solder.

Another object of the invention is to provide a solder leveller operating substantially horizontally to provide even treatment of the entire board and in which the board is moved fast enough for successful air knife levelling.

THE INVENTION

A solder leveller according to the invention includes:
curved-path defining rollers arranged across the bath to define a curved portion of a board path through the solder leveller;
at least two of the curved-path defining rollers comprising a pair of superimposed, biased together, board-gripping rollers having a nip therebetween beneath the free surface of the molten solder at which the board is gripped for drive;
means for rotational drive of at least one of the said pair of the board-gripping rollers;
the board path having:
an upstream portion above the free surface of the molten solder leading to,
the curved, board-heating and tinning portion below the surface of the solder, including the nips of the or each said pair of board-gripping rollers, at which the board is gripped and leading to,
a downstream portion above the free surface of the solder to the levelling means.

Normally the board-gripping rollers will be metallic and there will usually be more than one pair of them. The curved-path defining rollers may also include guide rollers provided singly and/or in pairs within and/or without the solder bath up- and/or down-stream of the board-gripping rollers.

In operation, a board approaches the surface of the molten solder along the up-stream portion of the board path and is moved below the surface of the solder. Here it is firmly grasped by the first of the pairs of board-gripping rollers and moved forwards at their brisk speed of rotation. In being gripped, the board has heat transferred to it by conduction from the rollers. It passes through the nips of the successive pairs of rollers. There are preferably three. As soon as it is heated to the melting point of solder, the copper contact pads etc. on the board are wetted by the solder and the board is thus tinned.

Because, in passing through the bath, the board is substantially horizontal—whilst first having a slight inclination in one direction and then having a slight inclination in the other direction—and because of the action of the board-gripping rollers in moving solder towards and away from the board, any air pockets in through-plated board holes are positively displaced allowing the plating of these holes to be tinned.

Having been passed around the path's curve, the board emerges from the solder at a speed suitable for levelling of the solder in the levelling means, preferably so called air knives.

The pairs of board-gripping rollers may be biased together in a variety of manners. Since most materials are buoyant in molten solder, the upper of each pair of these rollers may be journalled in a translationally fixed manner, whilst the lower roller is so journalled as to be free to float up against the upper roller. Alternatively, the lower roller may be fixed and the upper roller biased downwards, either by spring force and/or by its own weight.

The board-gripping rollers may be journalled in bearings attached to or guided on side walls of the solder bath. However, in the preferred embodiment a pair of separate roller support beams is provided extending longitudinally of the bath. Preferably the lower rollers are journalled in graphite bearing blocks held on the beams, whilst the upper rollers are journalled in graphite bearings able to move vertically on the beam, though biased down by their weight and bias springs onto the lower rollers.

Each upper roller may be constrained to move vertically and not horizontally by engagement of its bearings with the beams. However, in the preferred embodiment, the central upper roller alone is so constrained, whilst the upper rollers adjacent up- and down-stream along the board path are linked to the central roller by links interconnecting adjacent upper rollers' bearings.

Firm gripping of a board by the board-gripping rollers is important not only to drive the board along the board path, but also for heat transfer by conduction from the rollers to the board. Accordingly, in the preferred embodiment, board-gripping rollers have a large diameter and hence thermal capacity. Further guide rollers where provided will normally be of smaller diameter. In the preferred embodiment, guide rollers are provided both in pairs to grip the board though less strongly than the main rollers and as a single guide roller. The guide rollers direct the board in and out of the bath along the desired board path.

The board path is curved during that part of the board path of passing below the surface of the solder. Despite printed circuit boards being rigid at room temperature, curvature of them to pass along the board path is feasible because at the temperature of molten solder the boards become relatively flexible and because the radius of curvature of the path is comparatively large. Either of the upper or lower board-gripping rollers can be driven. However, in the preferred embodiment, the axes of the upper rollers are arranged above the surface of the solder, and it is convenient to drive the upper rollers directly—with the lower rollers being driven by directional contact between the pairs of rollers.

Solder circulation is important in a solder bath, since solder is a poor conductor of heat, as compared with most metals. Whilst a solder pump could be provided, it is anticipated that rotation of the totally immersed lower rollers may provide adequate circulation. However, further circulation is preferably provided for by means of at least one of the lower rollers having an impeller for moving solder axially through the roller.

To help understanding of the invention, a specific embodiment thereof will be described by way of example with reference to the accompanying drawings.

THE DRAWINGS

FIG. 4 is a cross-sectional end view on the line IV—IV in FIG. 3.

THE PREFERRED EMBODIMENT

Figure 1:
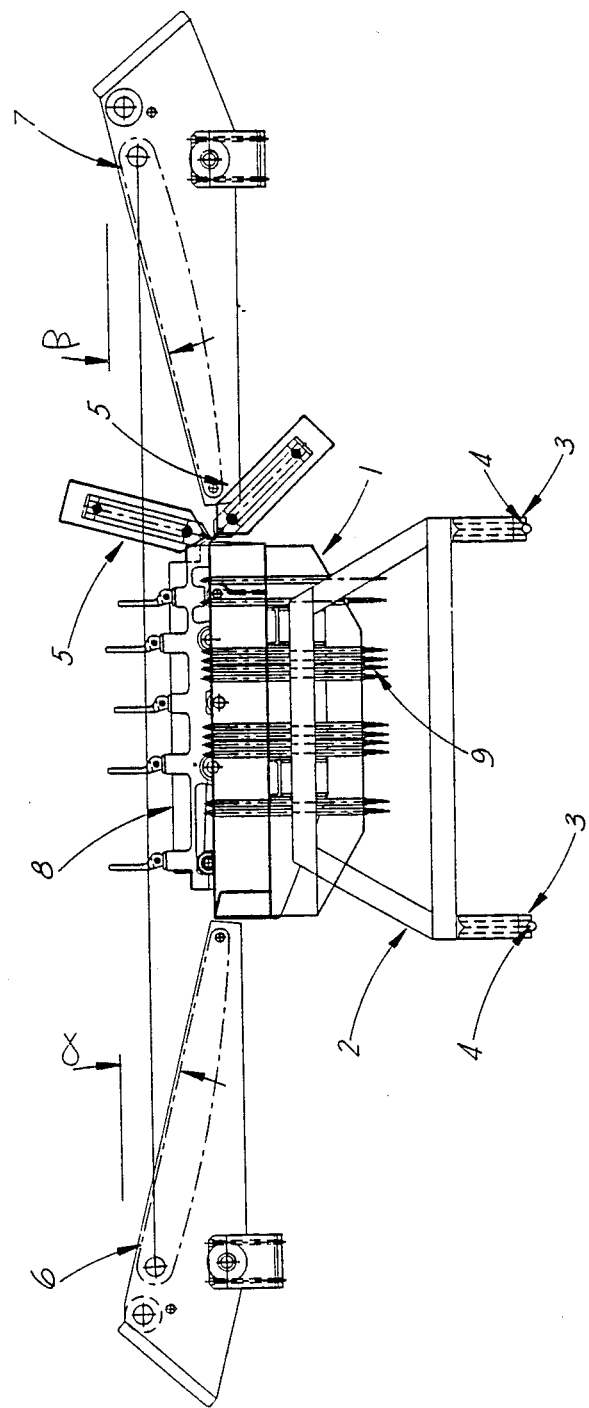
FIG. 1 is a side view of a solder leveller according to the invention.
Figure 2:
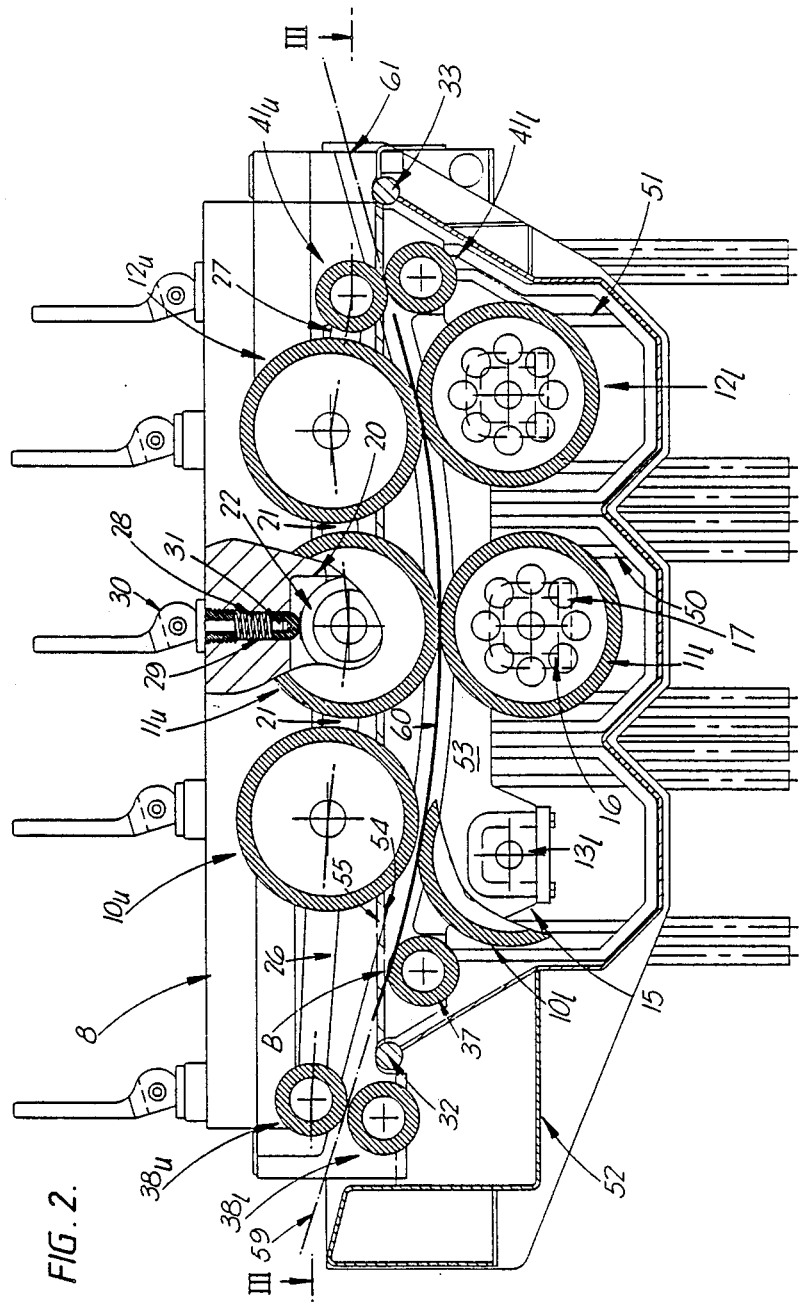
FIG. 2 is a central cross-sectional side view to a larger scale on the line II—II in FIG. 3.
Figure 3:
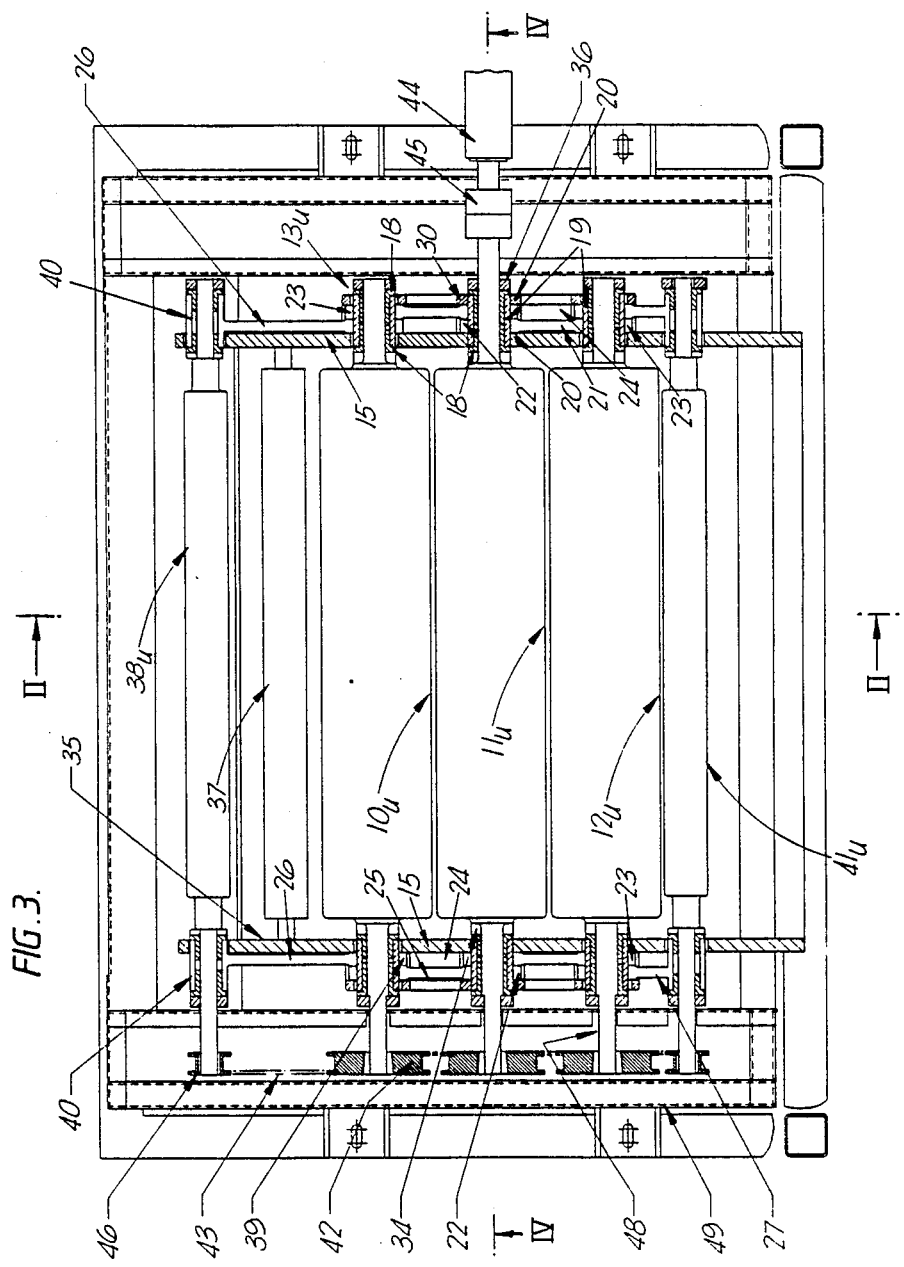
FIG. 3 is cross-sectional plan view on the line III—III in FIG. 2 from which certain components have been omitted for the sake of clarity.

Referring to the drawings, FIG. 1 shows a leveller of the invention having a solder bath 1 mounted on a frame-work 2 having wheels 3 engaged on rails 4 extending transversely of the solder bath. Solder levelling air knives 5 are mounted on the bath at its downstream end. An upstream conveyor 6 is arranged for transporting boards to be tinned to the bath and a downstream 7 conveyor is arranged for transporting away tinned boards. The conveyors 6, 7 are arranged at angles $\alpha$, $\beta$—both typically 13°—of entry and exit of the boards to and from the bath 1. The conveyors 6,7 are driven from a motor 44—described below—in synchronism with board-gripping rollers—also described below. Upstream of the feed-in conveyor 6 are arranged, but not illustrated, pre-treatment stations including cleaning, flux and preheating stations; downstream of the feed-out conveyor 7, again not illustrated, are post-treatment stations including cooling and washing stations. These pre- and post-treatment stations feed boards at typical speed of 1.5 to 7.5 m/min.

Also shown in FIG. 1 is the upper, cover portion 8 of a cast, roller support beam described in more detail below and non-heating portions 9 of heating elements extending in the solder bath.

Referring now to the other Figures, the solder bath 1 has three pair of upper and lower board-gripping rollers $10_u$, $10_l$; $11_u$, $11_l$; $12_u$, $12_l$, extending transversely of it. The rollers can be of metal which is not normally wetted by solder for instance stainless steel, nickel or titanium. However, it is preferably of wettable—though solder insoluble—metal for instance mild steel to provide even solder contact with the board. These rollers are journalled via end shafts 14 in upper and lower graphite bearings $13_u$, $13_l$ carried on roller support beams 15, extending along the bath 1, one on one side of the rollers and the other on the other side. The lower bearings $13_l$ are of rectangular cross-section and are held captive in downwardly open complementary seats 16 by straps 17 to translationally fix the lower rollers. It should be noted that although the straps 17 support the weight of the lower rollers when the solder bath is empty, when it is full of molten solder the lower rollers $10_l$, $11_l$, $12_l$, tend to float so that they are located directly by engagement of the bearings $13_l$ in their seats 16.

The upper graphite bearings $13_u$ each comprise a pair of flanged annular bushes 18 accommodated within a stainless steel, cylindrical sleeve 19. The sleeves 19 of the central, upper roller $11_u$ are located in vertically-extending, vertically extending bearing horns 20 in the beams 15. The horns are of such height that the upper roller $11_u$ can drop onto the lower roller $11_l$ or be lifted slightly from it by the thickness of a typical board B. A pair of links 21, having eyes 22 engaging around the sleeves 19 for the roller $11_u$, extend respectively up- and down-stream of the bath to the rollers $10_u$, $12_u$, where further eyes 23 at the other ends of the links 21 engage around the sleeves 19 for these rollers $10_u$, $12_u$. The beam 15 and its upper cover portion 8 have a cavity 24 at each bearing $13_u$ with inwardly-directed side faces 25 laterally captivating the links 21—and further links 26, 27 to be described—via their eyes 22, 23. Thus the centre links 21 are able to swing and move up and down with the upper rollers $10_u$, $11_u$, $12_u$, whilst the centre distances of the rollers are kept constant as they move to allow the board B to pass between the pairs of rollers.

The horns 20' at the sleeves 19 for the rollers $10_u$, $12_u$ are relieved to allow for slight movement of these rollers axially of the bath as the links 21 fore-shorten.

The upper rollers $10_u$, $11_u$, $12_u$ are urged towards the lower rollers $10_1$, $11_1$, $12_1$ by springs 28 acting on the eyes 22, 23 and housed in bores 29 in the upper beam portion 8. Each spring 28 is pre-loaded by an adjustable eccentric 30 accommodated on the beam and a pin 31 passing through the spring, whereby the degree of bias of each upper roller towards its lower roller can be adjusted to suit the thickness of the board B.

The beams 15 are secured to the solder bath 1 at weirs 32, 33 described below, thus they locate the rollers laterally of the bath by contact of thrust spacers 34 with the inner, opposed faces 35 of the beams and the ends of the rollers. The bearings $13_u$, comprised of the bushes 18, are located on the upper rollers' shafts 14 by thrust collars 36 secured to the shafts.

On the upstream side of the board-gripping rollers $10_u$, $10_1$, $11_u$, $11_1$, $12_u$, $12_1$, a lower idling guide roller 37 is provided, journalled in the same manner as the lower gripping rollers. Upstream of this is a pair of guide rollers $38_u$, $38_1$ journalled in the same manner as the main board-gripping rollers. Links 26 extending from the rollers $10_u$ have eyes 39 adjacent to eyes 23 and an enlarged eye 40 at the roller $38_u$ performing the function of the sleeve 19 in accommodating graphite bushes 18'. Similarly on the down-stream side a pair of guide $41_u$; $41_1$ is provided in like manner to the rollers $38_u$; $38_1$, with the upper roller $41_u$ linked to the roller $12_u$ by links 27. Thus all the upper rollers can be removed for service as one linked together unit.

To one side of the bath, the upper rollers' shafts 14 are extended and carry sprockets 42. Those on the shafts of the rollers $10_u$, $11_u$, $12_u$ are double and those on the shafts of the rollers $28_u$, $41_u$ are single. Respective drive chains 43 extend between each adjacent pair of sprockets 42, drivingly linking the adjacent rollers, whereby all the upper rollers are ganged together. A motor 44 drives the rollers via a dog clutch 45. Except for the idler roller 37, the lower rollers $38_1$, $10_1$, $11_1$, $12_1$, $41_1$ are all frictionally driven by their upper rollers due to the upper rollers being biased down onto the lower rollers. To guard against snatch of a board B and consequent damage to it, as it enters the first pair of rollers $38_u$, $38_1$ and is accelerated by them, a torque limiting clutch 46 is provided between the upper rollers' sprocket 42 and its shaft 14. The dog clutch 45 is provided to enable the bath to be disconnected from the motor 44 and withdrawn on its rails 4 for service.

The bath 1 is constructed of mild steel plate and supported on a chassis 47 itself supported on the framework 2. Along each side of the bath, channels 48 are provided inboard of which sides 49 extend up and drop down into a sump 50 centrally of the bath. Solder heating elements 51 are arranged across the bath in the sump 50 and have non-heating portions 9 in which their resistance wire is not coiled—looping over the sides 49 and out through the bottom of the channels 48.

At each end of the bath the liquid height control weirs 32, 33 are provided. Upstream of the upstream weir 32 a further small sump 52 is provided. In use, solder 53 is added as required to keep the free surface 54 of the solder just below the level of the weirs. Anti-oxidation oil 55 is pumped from the further sump 52 onto the solder 53 to flow back over the weir 32 and keep the solder covered.

In use of the solder leveller, the sump is filled with solder 53 which is kept molten by the heating elements 51. During idling, the motor 44 keeps the rollers turning at slow speed typically 5 rpm, this circulates the solder, partially by the solder being dragged around by the board-gripping rollers' peripheries and partly by the lower rollers being hollow and fitted with impellers 56 for moving the solder in one direction 57 through the roller $11_1$ and back in the other direction 58 in the rollers $10_1$, $12_1$. During operation the motor speed is varied between a board-gripping roller speed matching the pre- and post-treatment station speeds and a processing speed. When a board is detected as approaching down the feed-in conveyor 6 the motor is accelerated to provide a processing roller peripheral speed of the region of 50 m/min, given by roller rotation at 125 rpm for 125 mm diameter rollers. The board B on reaching the rollers 38, the lower of which runs in the oil 55, is accelerated and fed through the free surface 54 of the solder along an upstream portion 59 of a board path through the leveller. It is guided by the roller 37 and passes into the nip of the rollers 10. In passing along a curved portion 60 of the path through the nips of the three pairs of board-gripping rollers $10_u$, $10_1$; $11_u$, $11_1$; $12_u$, $12_1$, it is heated from an initial temperature in the region 50–150° C. to just above the eutectic point of the solder i.e. 183° C., by contact with the solder and more importantly, contact with the rollers which conduct heat to the board. The temperature of the solder is controlled in the region 220–260° C.; although the lower end of the range is preferred to inhibit the formation of inter-metallic compounds. In this respect it can be noted that parts of the board remain in the solder for equal lengths of time. On reaching the eutectic temperature the board's contact pads wet and are tinned. The board is fed out from the solder on a downstream path portion 61 and through the air knives 5 at the roller speed for effective levelling. As soon as the board clears the air knives, the rollers, together with the up- and down-stream conveyors, are returned to the speed of the pre- and post-treatment stations to await the next board.

Typical dimensions of the solder leveller are as follows:

| | |
|---|---|
| Board-Gripping roller diameter | 125 mm |
| Board-Gripping roller length | 650 mm |
| Bath length between weirs | 600 mm |
| Radius of curve path | 800 mm |
| Guide roller diameter | 50 mm. |

The invention is not intended to be restricted to the details of the above described embodiment. The leveller described is appropriate for processing boards which are up to 610 mm wide and of indefinite length over 290 mm. For other size of boards, the bath dimensions and the board-gripping roller number and dimensions may vary. The specified operating speeds and temperatures may vary. The overriding requirement is of course that the boards have been heated to the eutectic point and been wetted by the solder on emerging from the solder. The air knives may be constructed to be rigid with the bath or may be separate and spaced from the bath along the downstream portion of the board path.

I claim:

1. A solder leveller having a bath for containing molten solder with a free surface, said solder leveller including:

curved-path defining rollers arranged across said bath to define a curved portion of a board path through said solder leveller;

at least two of said curved-path defining rollers comprising a pair of superimposed, biased together, board-gripping rollers having a nip therebetween beneath said free surface of said molten solder at which the board (B) is gripped for drive;

means for rotational drive of at least one of said pair of board-gripping rollers;

means for levelling solder deposited on a board (B) as it leaves said bath; and means for providing a layer of solder-oxidation-inhibiting oil over said molten solder in said bath, said means including a sump from which said oil is pumped onto said molten solder and a weir over which said oil flows back to said sump to regulate depth of said oil over said molten solder, said nip of said pair of said board-gripping rollers being below the level of said weir;

said board path having:
an upstream portion above the free surface of the molten solder leading to,
the curved, board-heating and tinning portion below the surface of the solder, including said nips of the or each said pair of board-gripping rollers at which the board is gripped and leading to,
a downstream portion above the free surface of the solder leading to said levelling means.

2. A solder leveller according to claim 1, wherein the curved-path defining rollers comprise, in addition to said board-gripping rollers, guide rollers provided singly and/or in pairs within and/or without the solder bath.

3. A solder leveller according to claim 1, wherein said oil sump is upstream of said solder bath and one of said guide rollers runs in said oil sump.

4. A solder leveller according to claim 1, wherein a plurality of pairs of said board-gripping rollers is provided, said solder leveller including respective bearings fixed with respect to said bath for one of each pair of said board-gripping rollers and respective bearings translationally movable with respect to said bath for the other of each pair of said board-gripping rollers.

5. A solder leveller according to claim 4, wherein said bearings are of graphite.

6. A solder leveller according to claim 4, wherein said lower ones of the pairs of board-gripping rollers have said fixed bearings and said upper ones of said pairs of board-gripping rollers have said movable bearings, and said solder leveller includes means for urging said translationally movable bearings towards said fixed bearings, whereby said board-gripping rollers in each pair are biased together.

7. A solder leveller according to claim 6, wherein said urging means comprise a respective spring acting at one end thereof on each said translationally movable bearing.

8. A solder leveller according to claim 7, including adjustment means acting on the other end of each said spring, whereby the degree of bias of the or each said upper board-gripping roller towards the respective one of said lower board-gripping rollers is adjustable to suit the thickness of the board (B) to be passed along said curved portion of said board path.

9. A solder leveller according to claim 4, including a respective roller support beam at each end of said board-gripping rollers on which both said fixed and said translationally movable bearings at the respective ends of said board-gripping rollers are located, said beams extending longitudinally of and being fixed with respect to said bath.

10. A solder leveller according to claim 9, including respective inter-bearing links linking adjacent pairs of said movable, upper, board-gripping-roller bearings at each end of said upper board-gripping rollers, whereby separation of adjacent upper ones of said roller along said curved portion of said board path is determined.

11. A solder leveller according to claim 10, wherein a central one of said upper board-gripping rollers is constrained against horizontal movement by engagement of its said bearings with said beams.

12. A solder leveller according to claim 10, including drive sprockets carried on each said upper board-gripping roller and drive chains extending between said drive sprockets of adjacent rollers for ganging together rotational drive of said upper board-gripping rollers and driving said board (B) through said solder.

13. A solder leveller according to claim 1, including a drive motor and a drive connection from said motor to said upper board-gripping roller(s).

14. A solder leveller according to claim 13, including a support framework for said solder bath, support rails extending transversely of said board path, wheels journalled on said framework and running on said support rails for lateral withdrawal of said solder bath, and a dog clutch incorporated in said drive connection whereby said board-gripping rollers are drivingly disconnected from said motor on withdrawal of said solder bath.

15. A solder leveller according to claim 2, including at least three pairs of said board-gripping rollers and two pairs of guide rollers, one upstream of said board-gripping rollers and one downstream thereof.

16. A solder leveller according to claim 15, including a drive connection between said pair of board-gripping rollers having said rotational drive means, said drive connection including a torque limiting clutch between said driven upstream guide roller and its drive sprocket.

17. A solder leveller according to claim 1, wherein at least one of said lower board-gripping rollers is hollow, open at both ends and provided with an impeller for circulating said molten solder therethrough.

18. A solder leveller according to claim 1, wherein said solder bath includes a second weir for controlling the height of the free surface of said solder-oxidation-inhibiting oil above the free surface of said molten solder in said bath.

19. A solder leveller according to claim 18, including a pair of roller support beams on which said curved-path defining rollers are journalled, said roller support beams being supported at opposite ends thereof on said weirs.

20. A solder leveller according to claim 1, including electric solder heat elements extending in said bath across its bottom.

21. A solder leveller comprising:
a bath for molten solder,
air knives at a downstream end of said bath,
three pairs of board-gripping rollers arranged across said bath to define a curved board path portion below a free surface of said solder in said bath,
one pair of guide rollers upstream of said board-gripping rollers for guiding a printed circuit board (B)

into the nip of an upstream one of said board-gripping rollers, two beams one extending along one side of said bath and the other along the other side for supporting said rollers, lower bearings fixed to said beams for journalling said lower ones of said pairs of board-gripping and guide rollers, upper bearings movable up and down on said beams for journalling upper ones of said pairs of board-gripping and guide rollers, springs acting on said upper bearings for urging said upper rollers into board-gripping contact with said lower rollers, a drive motor for driving said upper rollers in rotation, and sprockets and chains for driving said upper rollers in synchronism.

22. A solder leveller according to claim 21, including another pair of guide rollers downstream of said board-gripping rollers for guiding the board (B) through said air knives.

23. A solder leveller according to claim 21, including:

an oil sump upstream of said solder bath, the lower one of said upstream pair of guide rollers running in said oil sump, and a pair of weirs for controlling the height of the free surface of solder-oxidation-inhibiting oil above the free surface of said molten solder in said bath, the nip of said board-gripping rollers being below the level of said weirs.

24. A solder leveller according to claim 21, including:

support rails extending transversely of said board path;

a support framework for said solder bath;

wheels journalled on said framework and running on said support rails for lateral withdrawal of said solder bath;

a drive motor for said board-gripping rollers fixed with respect to said support rails; and a drive connection including a dog clutch between said drive motor and said board-gripping rollers, whereby said board-gripping rollers are drivingly disconnected from said motor on withdrawal of said solder bath.

25. A solder leveller as claimed in claim 21, including a further drive connection including a torque limiting clutch between said upstream pair of guide rollers and said board-gripping rollers.

* * * * *